(12) United States Patent
Weiss

(10) Patent No.: US 11,116,332 B2
(45) Date of Patent: Sep. 14, 2021

(54) DISPENSING DEVICE FOR BAKERY PRODUCTS

(71) Applicant: R. Weiss Verpackungstechnik GMBH & Co. KG, Crailsheim (DE)

(72) Inventor: Reinald Weiss, Schopfloch (DE)

(73) Assignee: R. Weiss Verpackungstechnik GmbH & Co. KG

( * ) Notice: Subject to any disclaimer, the term of this patent is extended or adjusted under 35 U.S.C. 154(b) by 62 days.

(21) Appl. No.: 16/467,479

(22) PCT Filed: Dec. 7, 2017

(86) PCT No.: PCT/EP2017/081825
§ 371 (c)(1),
(2) Date: Jun. 6, 2019

(87) PCT Pub. No.: WO2018/104449
PCT Pub. Date: Jun. 14, 2018

(65) Prior Publication Data
US 2020/0214473 A1     Jul. 9, 2020

(30) Foreign Application Priority Data
Dec. 7, 2016   (DE) .................. 10 2016 123 717.5

(51) Int. Cl.
*A47F 3/02* (2006.01)
*A47F 1/12* (2006.01)
*A21B 3/07* (2006.01)
*G07F 11/58* (2006.01)
*G07F 17/00* (2006.01)

(52) U.S. Cl.
CPC .................. *A47F 3/02* (2013.01); *A47F 1/12* (2013.01); *A21B 3/07* (2013.01); *A47F 2003/021* (2013.01); *G07F 11/58* (2013.01); *G07F 17/0078* (2013.01)

(58) Field of Classification Search
CPC ........ A47F 3/02; A47F 2003/021; A47F 1/12; G07F 17/0078
See application file for complete search history.

(56) References Cited

U.S. PATENT DOCUMENTS

| 2,151,107 A | * | 3/1939 | Howard | ................ | G01G 13/00 177/103 |
| 4,171,067 A | * | 10/1979 | Faulkner | .............. | G01G 13/026 177/106 |
| 4,326,645 A | * | 4/1982 | Faulkner | .............. | G01G 13/026 222/1 |
| 4,402,426 A | * | 9/1983 | Faulkner | ............ | G01G 13/2855 177/113 |

(Continued)

*Primary Examiner* — Stanton L Krycinski
(74) *Attorney, Agent, or Firm* — Steve LeBlanc, LLC

(57) ABSTRACT

A dispensing device for holding, presenting, and removing baked bakery goods includes at least one dispensing tray having a supply section that enables stocking of the dispensing tray with bakery goods, a removal section for removing the bakery goods, a transport surface arranged between the supply section and the removal section, and a measuring device. The bakery goods pass the measuring device on their way from the supply section to the removal section, and the measuring device registers the presence or absence of the bakery goods and generates corresponding electrical signals.

9 Claims, 2 Drawing Sheets

(56) References Cited

U.S. PATENT DOCUMENTS

| | | | | |
|---|---|---|---|---|
| 5,104,002 | A | * | 4/1992 | Cahlander ........... A47J 37/1228 |
| | | | | 222/1 |
| 5,172,328 | A | * | 12/1992 | Cahlander ............... A47J 27/14 |
| | | | | 700/112 |
| 5,353,847 | A | * | 10/1994 | Cahlander ................. B65B 1/32 |
| | | | | 141/1 |
| 6,131,622 | A | * | 10/2000 | Fritze ...................... G07F 11/44 |
| | | | | 141/129 |
| 6,498,329 | B1 | * | 12/2002 | Gibernau ................ G07F 9/105 |
| | | | | 219/753 |
| 7,441,388 | B2 | * | 10/2008 | Sus ..................... A47J 37/1228 |
| | | | | 221/10 |
| 7,973,642 | B2 | * | 7/2011 | Schackmuth .......... G06Q 50/12 |
| | | | | 340/5.92 |
| 8,113,108 | B2 | | 2/2012 | Weiss |
| 8,276,505 | B2 | | 10/2012 | Buehler |
| 8,827,068 | B2 | | 9/2014 | Weiss |
| 9,528,766 | B2 | | 12/2016 | Matusewicz et al. |
| 10,080,445 | B2 | | 9/2018 | Da Silva et al. |
| 2006/0086679 | A1 | * | 4/2006 | Simpson ................ B65D 71/36 |
| | | | | 211/59.2 |

\* cited by examiner

DISPENSING DEVICE FOR BAKERY PRODUCTS

PRIORITY CLAIMS

This application claims priority to PCT application PCT/EP2017/081825 filed Dec. 7, 2017, which claims priority to German Patent Application Number 10 2016 123 717.5 filed Dec. 7, 2016.

FIELD OF THE INVENTION

The present invention relates to a dispensing device for holding, presenting, and removing bakery goods having at least one dispensing tray.

BACKGROUND OF THE INVENTION

Such devices are of particular interest for provision, presentation, and removal of ready-baked bakery goods in retail establishments, such as supermarkets, where the customer is presented with the ready-baked or crisped-up bakery goods and said bakery goods are offered for sale after removal by the customer.

Dispensing devices, in particular for bakery goods, which have a plurality of dispensing trays, are known from the prior art. The dispensing trays are filled with bakery goods by human intervention and presented to the customer for removal. If the dispensing trays are not sufficiently filled, the responsibility for refilling and baking the corresponding bakery goods lies with the responsible personnel. The disadvantage here is that a determination of the number of units of the respective bakery good has to be carried out by the personnel.

BRIEF DESCRIPTION OF THE INVENTION

It is an object of the present invention to develop a device of the type mentioned in such a way that a reliable refilling of at least one dispensing tray of a dispensing device is possible.

This object is solved by the features of claim 1.

The dispensing device according to the invention for holding, presenting, and removing bakery goods comprises at least one dispensing tray, which comprises a supply section, a removal section and a transport surface arranged between the supply section and the removal section. The supply section allows the loading of the dispensing tray with bakery goods, preferably by means of an automated feed device, or also manually. Bakery goods may be stored not only one behind the other, but also side by side in the dispensing tray. The removal section is located at the front of the dispensing device facing the customer and is used for the removal of the bakery goods by customers. The bakery goods located on the transport surface are preferably transported in a sliding manner, i.e., driven by their own gravity, into the removal section.

According to the invention, a measuring device is provided which registers whether bakery goods pass the measuring device on their way from the supply section to the removal section. The measuring device can determine here whether and/or whether not bakery goods are moving on the transport surface and/or are stored there. The measuring device is designed and set up such that it registers the presence and/or absence of bakery goods in the dispensing tray and generates corresponding electrical signals. These may in particular be further processed by a control unit.

The measuring device may be designed as a contact switch, which is triggered by a bakery good touching the switch when sliding past it. According to an alternative, an optical registration by means of an optical transmitter-receiver unit may be realized, wherein the bakery good in the dispensing tray, for example, interrupts the light path between transmitter and receiver, and the measuring device generates a corresponding electrical signal.

However, the measuring device particularly preferably comprises a measuring surface in the region of the transport surface and a force transducer (for example a force sensor) coupled to the measuring surface, which is designed to generate electrical signals which are dependent on the presence (or absence) and/or the weight of one or several bakery goods on the measuring surface. The presence and/or the weight of the bakery goods may be measured, when the bakery goods rest on the measuring surface or are transported on said measuring surface toward the removal section, in particular in a sliding manner. The bakery goods may not only be stored one behind the other, but also side by side on the measuring surface.

Accordingly, the force transducer can thus register in particular whether bakery goods are present on the measuring surface. The corresponding electrical signal may then be further processed and output, for example, a signal for refilling the corresponding dispensing tray with the corresponding bakery good and/or trigger baking.

It is advantageous if the force transducer is designed as a load cell. The load cell is able to determine compressive forces and/or tensile forces. A strain gauge is preferably used, which detects an elastic deformation and further processes it. The strain-proportional resistance change makes it possible, in particular, to convert the mass of the item to be weighed, i.e., one or more bakery goods, into a proportional electrical signal, in order to then relay said electrical signal in particular to a control unit. Such a configuration of the load cell allows for an accurate and reliable measurement of the force acting on the load cell, in particular the weight force of the bakery good(s). Alternatively, it is merely registered whether a baked good is present on the measuring surface, wherein the force transducer registers the exceeding of a predetermined threshold value.

According to an advantageous embodiment, the measuring surface is not arranged directly on the removal section, but further upstream toward the supply section. Preferably, the measuring surface is located several bakery good lengths behind the foremost bakery good (i.e., the bakery good to be removed next). If the foremost bakery good and possibly other bakery goods are removed by a customer, then there are usually still more corresponding bakery goods in the dispensing tray so that it can be refilled before it is completely emptied.

Particularly preferably, the measuring device, in particular said force transducer in the case of the design of the measuring device with measuring surface and force transducer, is coupled with a control unit associated with the dispensing device or with an external control unit. Said control unit is in particular designed and arranged such that it is operable to process the signals transmitted by the measuring device, in particular said force transducer, and transmit them to a feed device, wherein the feed device is preferably designed for automatically feeding bakery goods to the respective dispensing tray. Advantageously, the control unit is in particular able to register whether and, if so, how many bakery goods have passed the measuring surface in order to ensure, in particular, by means of the feed device, a sufficient supply of the dispensing tray(s). It goes without saying that the control unit has an integrated electronic processing unit (a computer) or is connected to an external electronic processing unit or a computer. Both cases are covered here with the term control unit. For the sake of simplicity, therefore, in the present context, a control unit is mentioned, which can process the electrical signals.

However, manual refilling is also possible if, for example, the measuring device, in particular said force transducer, is coupled to an audible and/or visual indicator which gives an operator a signal for manually refilling the dispensing device(s).

It is advantageous if time-related presence and/or weight measurements can be carried out by means of the measuring device, in particular by means of said force transducer. The weight measurements may be carried out at pre-defined time intervals. The predefined time intervals allow a good inventory control and ensure timely baking and/or loading of the dispensing tray(s). Such measurements allow for an automated and regular stock check of the respective dispensing trays. Alternatively or additionally, it is measured continuously, and, in the presence or even in the absence of a bakery good, a corresponding signal is output on the measuring surface, in order to trigger a possibly necessary loading of the corresponding dispensing tray. Furthermore, it is possible to carry out a measurement on request of an operator, who may be located at a remote location, so that it is thus possible, for example, to carry out control measurements. It is then possible to compare the measurement results of the time-related and/or event-related measurement with these query-specific measurements, and also to check the current inventory of the dispensing tray from a remote location, for example the supermarket checkout or from an office in the supermarket.

It is likewise advantageous if the force transducer is arranged next to or below the measuring surface. In both cases, the force transducer is provided in the immediate vicinity of the measuring surface, so that a simple structure and accurate measurements result. Also, a simple replacement of the corresponding unit is possible.

In order to realize a sliding of the bakery goods, it is advantageous if the transport surface is designed as an angled surface (or a plurality of successive angled surfaces). With such a design, it is advantageous if the angled surface (or an angled surface section) is inclined at an angle between 20° and 60° with respect to a horizontal toward the removal section. Depending on the type of bakery good, their weight and/or consistency (possible adhesion to the transport surface), the angle may be advantageously adjusted. For example, the angle of the angled surface may be increased for bakery goods that tend to stick. Such a configuration has the advantage that there is no need for different transport surfaces, instead passive, i.e., sliding transport of different bakery goods is possible simply by angular adjustment.

A curved configuration of the transport surface is also possible, as well as a combination of successive straight and curved sections along the transport surface. It only has to be ensured that—if the gravity of the bakery goods is to be exploited—the bakery goods move by sliding in the dispensing tray to the removal section.

It is advantageous if a vibrator conveys the bakery goods located on the transport surface in the removal section or contributes to their transport. The motor-driven vibrator can be designed, for example, as a pin or a strip, which acts on the transport surface from below and displaces it with a high-frequency oscillating or vibrating motion. At this it is advantageous that different designs of the transport surfaces are not necessary in the various dispensing trays, because the bakery goods—preferably supported by an inclination of the transport surface, which promotes the gravity-driven sliding of the bakery goods—are moved by means of the vibrator.

According to an alternative embodiment, a purely active transport of the bakery goods in the dispensing trays is realized. The transport surface may, for example, comprise one or several conveyor belts running in the respective dispensing tray toward the removal section.

It is also advantageous if the removal section is preferably closable by means of a movable flap. The movable flap acts as a protective device which protects the bakery goods from soiling or unintentional contact with customers and must be actively opened to remove the bakery goods. Alternatively or additionally, the removal opening is designed as a removal slot through which the customer accesses the foremost bakery good. This also avoids unintentional touching of the bakery goods by a customer.

In order to facilitate recognition of the bakery goods by the customer, it is advantageous if the flap and/or the removal slot are made of a transparent material, in particular plastic or glass. The transparent design of these front-side elements of the dispensing device allows an immediate presentation of the bakery goods, which is supposed to encourage the customer to buy.

In an advantageous embodiment of the invention, the dispensing tray preferably comprises a frame, which is advantageously designed like a grid to enable viewing the bakery goods. This is a structurally particularly simple and inexpensive embodiment of the dispensing device. Likewise, a dispensing tray made of a transparent material, in particular of plastic or glass, is realizable and is advantageous.

Also proposed is an apparatus for storing, baking, and dispensing bakery goods, having at least one storage station for receiving unbaked or semi-baked bakery goods, at least one baking station, and at least one dispensing device as described above. The baking station, which is preferably designed as a continuous baking oven, is provided for baking or crisping-up the bakery goods.

Particularly preferably, the device has a feed device, which is automated and designed for the transport of bakery goods between at least two of the aforementioned devices, i.e., the at least one storage station, the baking station, and the dispensing device. In addition, an infeed station and/or an outfeed station for bakery-stocked or empty carriers may be provided, wherein one or both of these stations may be integrated in a storage station. The feed device is preferably designed as a robot, which is furthermore preferably arranged centrally between an infeed and/or storage station, the baking station, an intermediate storage station, and the dispensing device. Said devices are preferably arranged on each side of the robot, preferably forming a rectangle around the robot.

Furthermore, it is preferred that a control unit is provided for controlling the automated feed device, which also processes the electrical signals of the measuring device, in particular of said force transducer, of the dispensing device and correspondingly activates the automated feed device. The control unit preferably also assumes the control of at least one of the three or four said stations or devices.

It is advantageous if the feed device is designed such that by means of the signals transmitted by the control unit it is possible to supply with bakery goods and/or to remove bakery goods from at least one of the stations. The signals of the measuring device, in particular of said force transducer, are transmitted to the control unit, so that it controls the feed device for carrying out various actions. For example, the feed device thus controlled removes a sheet with bakery goods from the or a storage station and transfers this to the baking station. The feed device may preferably also be controlled by the control unit such that bakery goods—passing through the baking station individually or on a baking tray—are received at the exit of the baking station and transported into the intermediate storage station or directly into the dispensing device. The design of the feed device as a robot offers advantages in terms of speed and relatively simple programming.

Thus, bakery goods (individually present and/or individually in trays or on supports and/or several on carriers or sheets or grates) may thus be placed into and/or removed from said stations and device by means of the feed device, and transport between said stations and devices is possible. In particular, the sufficient supply of the dispensing trays of the dispensing device may be assumed by the feed device. For this purpose, the feed device removes, for example, a carrier with the bakery goods to be refilled from a storage station in which said carriers are stored with the baked or crisped-up bakery goods, and transfers it to the dispensing device. Said dispensing device usually has several dispensing trays. In order for the feed device to know in which dispensing tray the bakery goods have to be placed, corresponding information is stored, for example, in the control unit for identifying the dispensing trays or their respective measuring devices. Thus, if a particular measuring device sends a predetermined electrical signal to the control unit for the purpose of refilling with bakery goods, said control unit gives the feed device the command to place the corresponding bakery goods in the dispensing tray. For ease of filling, the feed device may for example have an end gripper head with a funnel, which directs the bakery goods when tilted from the carrier in the supply section of the corresponding dispensing tray. For this purpose, the funnel can in turn be designed to be movable with respect to the gripper head; when gripping the carrier, the funnel is retracted, for example, in a rest position and extended during tilting into its working position. Other guiding constructions for the bakery goods for respectively filling the dispensing trays, including those at the dispensing trays themselves, are alternatively or additionally possible.

A possible command to the feed device may also be that it loads the oven station with raw or unbaked bakery goods that are no longer present or no longer present in a sufficient predetermined number in the corresponding dispensing tray. It is also possible that the control unit actuates the baking station and initiates or controls the crisping-up of the corresponding bakery goods supplied to the baking station (by means of the feed device).

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
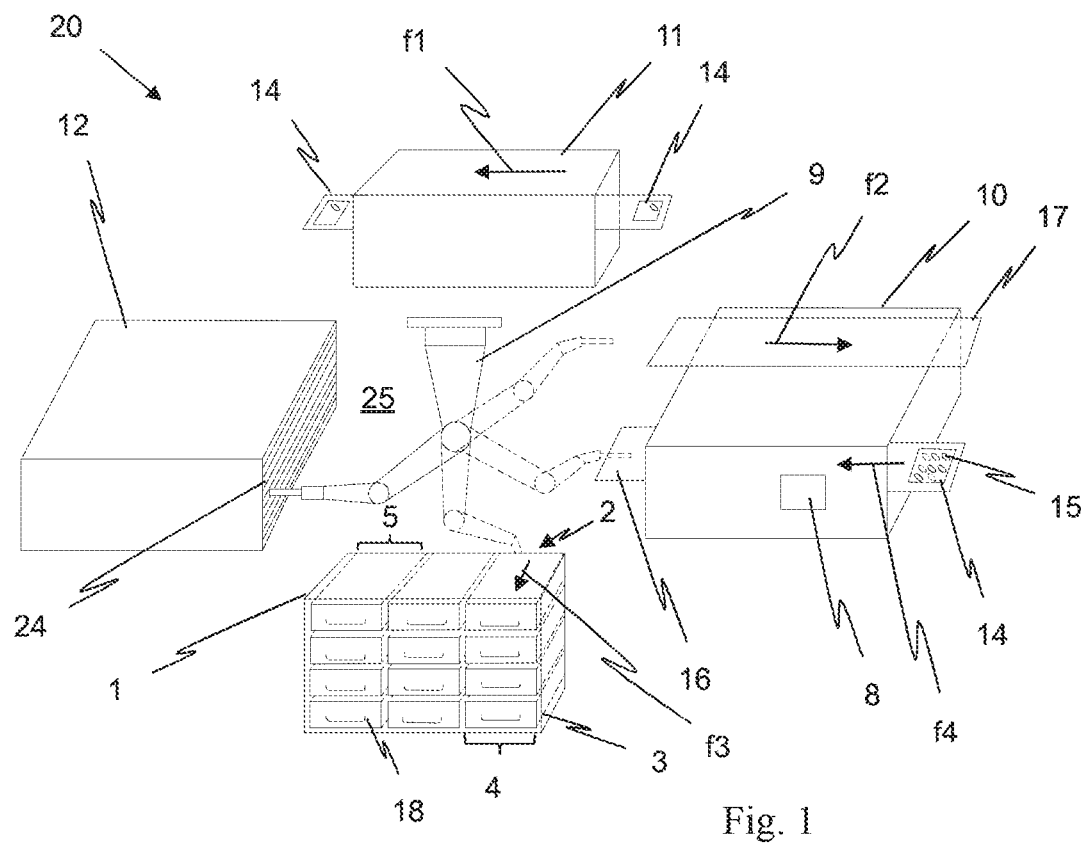
FIG. 1 shows a perspective view of a device for storing, baking, and dispensing bakery goods having a dispensing device according to the invention.

FIG. 1 shows a perspective view of a device 20 for storing, baking, and dispensing bakery goods 15, which is preferably set up in a supermarket in a separate room from the customer area, but adjacent to the customer area. An infeed and storage station 10, a baking station 11 designed as a continuous oven, an intermediate storage station 12 and a dispensing device 1 are provided. The infeed and storage station 10 is used for transferring carriers 14 (for example, baking sheets) on which bakery goods 15 are stored that are to be baked, for storing carriers 14 with unbaked or baked bakery goods 15, and for discharging empty carriers 14. The intermediate storage station 12 opposite the infeed and storage station 10 has a plurality of storage compartments 24 for carriers 14 either empty or filled with bakery goods 15. The baking station 11 may be fed at one end with carriers 14 on which pre-baked or still unbaked bakery goods 15 are located. The direction of passage of the bakery goods is marked with the arrow f1. At the other end of the baking station 11, the carriers 14 with the ready-baked bakery goods 15 may then be removed. The bakery goods 15 may be removed at the dispensing device 1, which will be discussed in more detail later.

Centrally with respect to the infeed and storage station 10, the baking station 11, the intermediate station 12, and the dispensing device 1, a feed device 9 designed as a robot is provided, for example, which is attached hanging on a building ceiling (not shown), for example. The robot is movable in all three spatial directions and has an end-side gripping portion with which it can grasp in particular carriers 14 at the edge in order to move the carrier 14—with or without bakery goods 15—in the interior 25 of the device 20.

A transport device designed as an incoming conveyor 16 leads through the infeed and storage station 10 to the interior 25 of the device 20. Carriers 14 filled with bakery goods 15 are placeable onto the incoming conveyor (16) (conveying direction f4) from the outside, for example manually, which, after passing through the infeed and storage station 10, are then engageable by the feed device 9 and are transportable to the baking station 11 or into the storage compartments 24 of the intermediate storage station 12. Also, placing the carriers 14 into the compartments (not shown in detail) of the infeed and storage station 10 itself by means of the feed device 9 is possible. It may also—alternatively or additionally—be provided that these compartments are supplied from the outside with carriers 14 and bakery goods 15 located thereon as raw products. Here, the feed device 9 assumes in the interior 25 of the device 20 all transport paths of the carriers 14 stocked with or without bakery goods 15. A discharge conveyor 17 for the emptied carriers 14 is shown in the illustrated embodiment only schematically above the housing of the infeed and storage station 10 (conveying direction f2). The feed device 9 deposits the empty carriers 14 on the discharge conveyor 17, which leads out of the interior 25.

Figure 2:
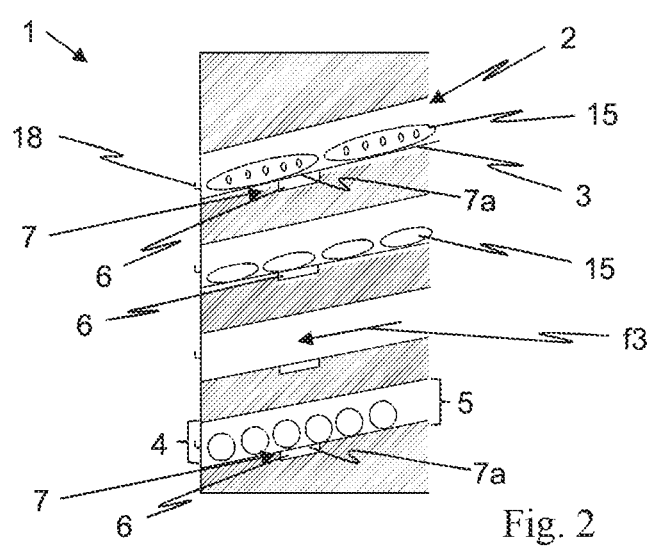
FIG. 2 shows a sectional view of the dispensing device shown in FIG. 1.

As can be seen from FIG. 1 and the sectional view of FIG. 2, the dispensing device 1 comprises a plurality of dispensing trays 2 arranged next to one another and one above the other, each having a supply section 5, a removal section 4, and a transport surface 3 arranged between them. The transport surface 3 is here inclined at an angle of approximately 25° toward the removal section 4, so that the bakery goods, driven by their gravity, are able to slide to the removal section 4. In a further development it is provided that the transport surface 3 is adjustable in its inclination.

The bakery goods 15 located on the transport surface 3 slide (sliding direction f3) from the supply section 5 to the removal section 4. The supply section 5, which faces away from the customer side, enables the bakery goods 15 to be unloaded by means of the feed device 9 into the respective dispensing devices 1.

According to the invention, a measuring device 7 is provided which registers the presence and/or the absence of bakery goods 15 in the respective dispensing tray 2. In the exemplary embodiments shown, the measuring device 7 comprises a measuring surface 7a in the region of the transport surface 3, the measuring surface 7a in the present case being integrated flat in the transport surface 3 or enclosed by it. At the under-side of the measuring surface 7a, a force transducer 6 is coupled as part of the measuring device 7 comprising a strain gauge, for example, which is here designed as a known load cell. The force transducer 6 is capable of generating an electrical signal as a function of the presence (by means of exceeding the threshold value) and/or the weight of at least one bakery good 15 on the measuring surface 7a. The at least one bakery good 15 may be located resting on the measuring surface 7a (for example because it rests against another bakery product 15 stored in front of it) or it can slide over the measuring surface 7a.

According to the exemplary embodiment of FIG. 2, the measuring surface 7a is arranged in the lowermost dispensing tray 2 such that the two bakery goods closest to the removal section 4, i.e., the two foremost bakery goods 15, have passed the measuring surface 7a on their way from the supply section 5. By contrast, the following two bakery goods 15 are located on the measuring surface 7a, since their path to the removal section 4 is blocked by the front bakery goods 15. In the second uppermost dispensing tray 2 bakery goods 15 formed as baguette rolls are placed; here, the bakery good 15 second to the front is the one that lies on the measuring surface 7a. The purpose of this arrangement of the measuring surfaces 7a is that the force transducers 16 are able to detect, for example, when the bakery goods 15 located on the respective measuring surface 7a—after a customer removes the foremost bakery good(s) 15—slidingly leave the measuring surface 7a toward the removal section 4 and, for example, no more bakery goods 15 slide down. The signals generated correspondingly over time by the force transducer 6 may be processed accordingly by a control unit 27 (see FIG. 3 and associated description below) and used in particular as control signals for the feed device 9, in particular for conveying the corresponding bakery goods 15 into the corresponding dispensing devices 1 and/or in the baking station 11 for timely baking. If, for example, the force transducer 6 transmits a measuring signal to the control unit 27 every second and within five seconds no bakery goods 15 slide down onto a free measuring surface 7a, the thus-informed control unit 27 may send a subsequent delivery signal to the feed device 9. Additionally or alternatively, it is possible, based on the number of bakery goods 15 passing the measuring surface 7a to create demand or requirement statistics and/or trigger an effective baking of required corresponding bakery goods 15 and/or to order additional orders from the wholesale baker.

In the illustrated embodiment, two bakery goods 15 present as baguettes are located in the top dispensing tray 2, wherein here the foremost lies on the measuring surface 7a. If the rear baguette slides down after removal of the front one, no signal for supplying is yet transmitted to the feed device 9 by the control unit 27, for example. This happens only if no new one slides down when the second baguette is removed.

The aforementioned scenarios are given by way of example only. The arrangement of the force transducer 6 in the dispensing trays 2 of the dispensing device 1 is selectable according to the desired detection of the presence and/or absence of bakery goods 15 on the associated measuring surface 7a.

It is also easily possible that the bakery goods 15 are located on a dispensing tray 2 not only one behind the other, but also next to each other. The measuring surface 7a then preferably extends over the width of the dispensing tray 2 such that the all of the plurality of side-by-side bakery goods 15 are detected.

Figure 3:
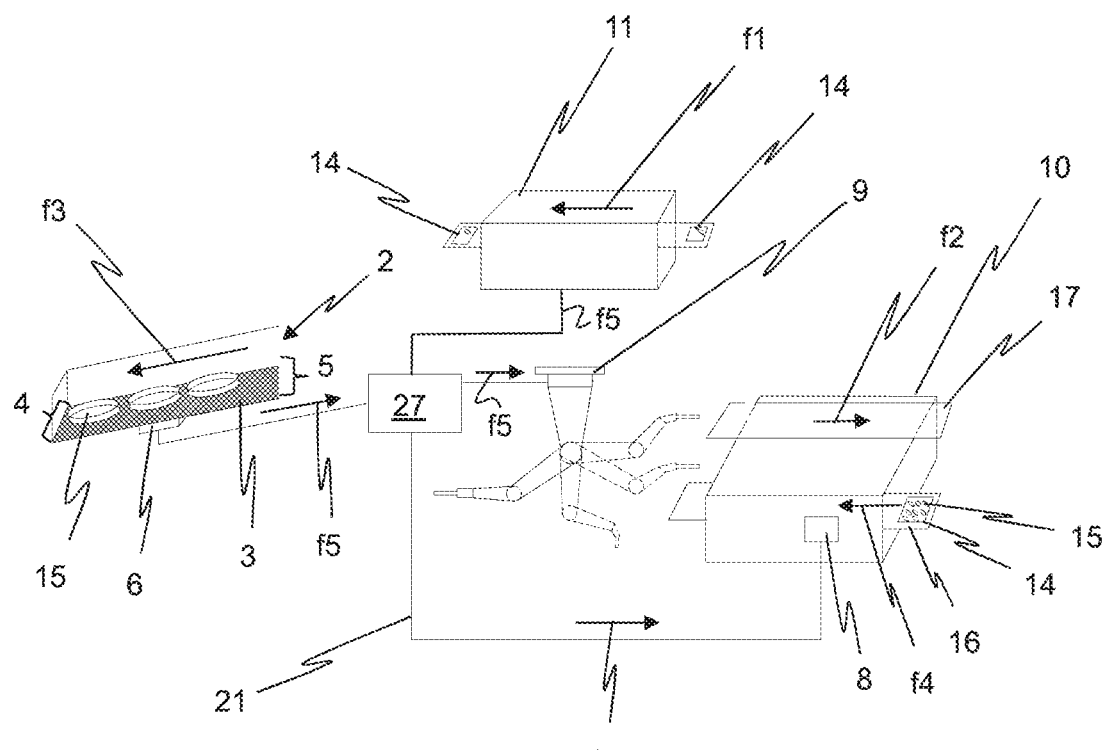
FIG. 3 shows a schematic representation of the signal transmission of the measuring device to a control unit.

FIG. 3 shows a schematic representation of the signal transmission of a force transducer 6 to the control unit 27 (not shown is the intermediate storage station 12). The control unit 27 transmits the received electrical signals of the force transducer 6 to the feed device 9, which executes the respective required commands. The signal transmission paths are marked with arrows f5. Upon detection of a need for crisped-up bakery goods 15 by means of the force transducer 6 in the respective dispensing trays 2, the feed device 9 supplies, for example, carriers 14 to the baking station 11. Alternatively or additionally, it is conceivable that the feed device 9 removes carriers 14 with already crisped-up bakery goods 15 from one of the storage stations 10, 12 provided for this purpose and supplies the dispensing device 1 with bakery goods 15 through the feed section 5. The filling of the supply sections 5, for example by tilting the carrier 14, may take various forms, for example by means of a funnel on the supply section, an end-side funnel on the feed device 9, a width of the supply section 3 adapted to the width of the carrier 14, etc.

In addition, the control unit 27 may transmit signals to a signal output device 8, which in the present case is arranged at the infeed and storage station 10 and at which the operating personnel can read, for example, stock information as well as possible error messages.

In general, time-related and/or event-related and/or query-specific measurements with respect to the bakery goods 15 may be carried out by means of the force transducers 6.

Figure 4:
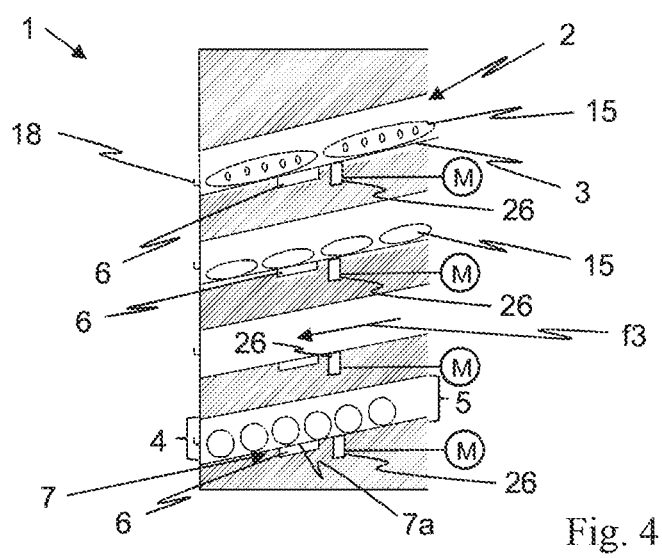
FIG. 4 shows a sectional view of another embodiment of a dispensing device, in this case with vibrators.

In the embodiment according to FIG. 4, motor-driven vibrators 26 are additionally indicated, which are capable of acting on the respective entire transport surface 3 and assist the gravity-driven sliding of the bakery goods 15 over the transport surface 3 into the removal section 4 in the sliding direction f3. The arrangement of the vibrators 26 in addition to the respective force transducer 6 is given only as an example.

In FIGS. 2 and 4, the removal sections 4 of the dispensing trays 2 are closable, each with a pivotable or displaceable flap 18. Preferably, the flaps 18 are formed of a transparent material, so that the customer can see the bakery goods 15 in the dispensing trays 2. According to an alternative, the removal sections 4 have slots narrowing in the cross-section through which the customer has to reach through to be able to remove the respective foremost bakery good 15. Preferably, the dispensing trays 2 are each formed as a grid-like frame. Alternatively, they consist of a transparent material, in particular of plastic (e.g., Plexiglas) or glass.

The present invention is not limited to the illustrated and described embodiments. Variations within the scope of the claims are also possible as a combination of features, even if they are shown and described in different embodiments.

LIST OF REFERENCE NUMBERS 1 dispensing device
2 dispensing tray
3 transport surface
4 removal section
5 supply section
6 force transducer
7 measuring device
7a measuring surface
8 signal output device
9 feed device
10 infeed and storage station
11 baking station
12 intermediate storage station
14 carrier
15 bakery goods
16 incoming conveyor
17 discharge conveyor
18 flap
20 device for storing, baking, and discharging bakery goods
24 storage compartments
25 interior
26 vibrator
27 control unit
f1 conveying direction
f2 conveying direction
f3 sliding direction
f4 conveying direction
f5 signal transmission

What is claimed is:

1. A dispensing device for holding, presenting, and removing bakery goods, with at least one dispensing tray, wherein the at least one dispensing tray comprises:
    a supply section which allows the supply of the at least one dispensing tray with bakery goods;
    a removal section for removing the bakery goods;
    a transport surface arranged between the supply section and the removal section on which the bakery goods arrive from the supply section at the removal section;
    a measuring device, wherein the bakery goods pass the measuring device on their way from the supply section to the removal section, wherein the measuring device registers the presence of these bakery goods and/or the absence of bakery goods and generates corresponding electrical signals;
    wherein the measuring device comprises a measuring surface in the transport surface and a force transducer coupled to the measuring surface, wherein the bakery goods, on their way from the supply section to the removal section, temporarily rest on the measuring surface or slide over the measuring surface, and the force transducer generates the electrical signals;
    wherein the measuring surface is arranged such that at least one of the bakery goods located behind the foremost bakery good which is located in the removal section can rest on the measuring surface; and
    wherein the transport surface is inclined between 20° and 60° downwards in the direction of the removal section, wherein the bakery goods are able, at least partially driven by their gravity, to slide to the removal section.

2. The dispensing device as in claim 1, wherein the force transducer is a load cell.

3. The dispensing device as in claim 1, wherein the measuring device is coupled to a control unit associated with the dispensing device or to an external control unit and operable to process the electrical signals generated by the measuring device and transmit the electrical signals to a feed device that supplies bakery goods to the dispensing tray.

4. The dispensing device as in claim 1, wherein time-related and/or event-related and/or query-specific measurements in relation to the bakery goods are possible.

5. The dispensing device as in claim 1, wherein the force transducer is arranged next to or below the measuring surface.

6. The dispensing device as in claim 1, further comprising at least one vibrator in the transport surface to at least partially act on the bakery goods on the transport surface.

7. The dispensing device as in claim 1, further comprising a movable flap or a slot in the removal section for removing individual bakery goods.

8. The dispensing device as in claim 1, wherein the dispensing tray comprises a grid frame.

9. The dispensing device as in claim 1, wherein the dispensing tray comprises a transparent material.

* * * * *